United States Patent [19]
Pratt

[11] Patent Number: 5,294,771
[45] Date of Patent: Mar. 15, 1994

[54] ELECTRON BEAM WELDING

[75] Inventor: Anthony L. Pratt, Pucklechurch, England

[73] Assignee: Rolls-Royce plc, London, England

[21] Appl. No.: 992,533

[22] Filed: Dec. 17, 1992

[30] Foreign Application Priority Data

Dec. 17, 1991 [GB] United Kingdom ............... 9126765
Dec. 8, 1992 [GB] United Kingdom ............... 9225604

[51] Int. Cl.⁵ .............................................. B23K 15/00
[52] U.S. Cl. ........................... 219/121.14; 219/121.34
[58] Field of Search ..................... 219/121.13, 121.14, 219/121.34

[56] References Cited

U.S. PATENT DOCUMENTS 4,348,576 9/1982 Anderl et al. ............... 219/121.29 X
4,376,886 3/1983 Sciaky et al. ..................... 219/121.14

Primary Examiner—C. L. Albritton
Attorney, Agent, or Firm—Oliff & Berridge

[57] ABSTRACT

An electron beam welding apparatus in which the beam deflection coils controlling the weld may be modified by the superimposition of a variable input voltage so as to control the fade-out slope of the welding region.

3 Claims, 2 Drawing Sheets

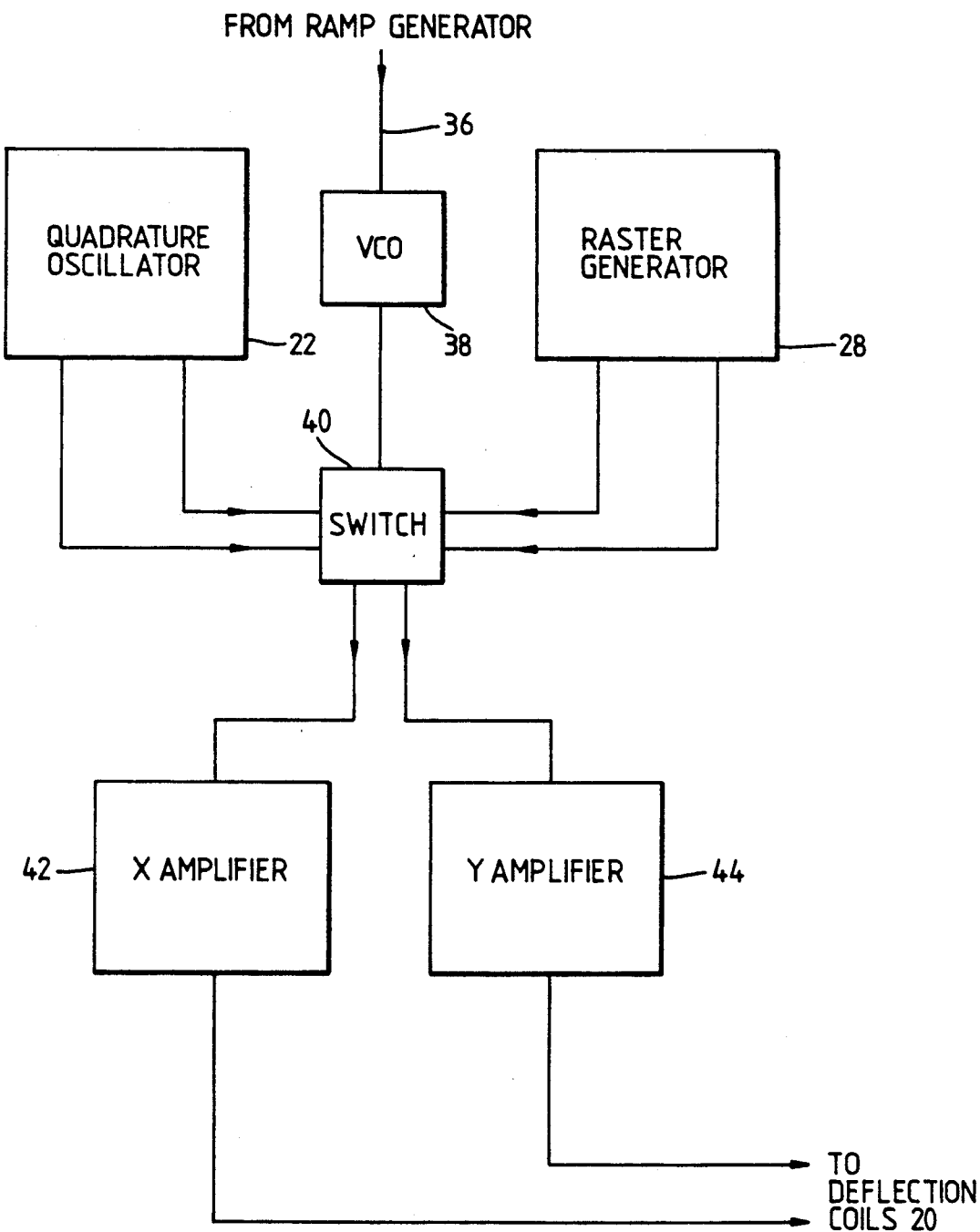

ELECTRON BEAM WELDING

This invention relates to electron beam welding and, in particular to a method and apparatus for decreasing beam penetration at the completion of a weld in planetary and circumferential joint configurations.

The use of beam deflection in electron beam welding has previously been employed to improve the fusion zone profile and top bead appearance, and to reduce defects in a weld. In addition, electron beam equipment of a kind similar to that used in welding has also been used to modify properties of materials by heat treatment applied to the surface of a workpiece.

For instance, many titanium alloys may be electron beam welded at high linear speeds 2.5-2 meters/min, and good weld shapes and minimum porosity are achievable under these circumstances.

However, there are some titanium alloys which cannot be electron beam welded at such high speeds. In these alloys the fast cooling rates involved result in a weld that has zones of unacceptable hardness and reduced fracture toughness, which may be attributed to the presence of orthorhombic martensite in the weld. Attempts have been made, when electron beam welding such alloys which cannot be welded at high speeds, to use much lower speeds (e.g. 25 cm/min) together with beam oscillation wherein the beam is moved in an elliptical path along the weld to achieve a measure of pre- and post-weld heating.

In the fade down of these slow speed oscillating beam welds the last metal to solidify is chilled rapidly by the cold metal underneath and the high cooling rate results in the formation of a zone of hardness and hence reduced fracture toughness. To overcome this, an "in-chamber heat treatment" has been developed in which the weld is slowly rotated under a defocused beam so that the hard zone is heated above the beta transus and cools slowly. This method has disadvantages from the process control point of view in that there is no practicable way of checking that the in-chamber heat treatment has been carried out. There are further disadvantages in that there are problems of distortion and product assurance when removing high hardness by "in-chamber heat treatment" under a defocused beam.

Accordingly, it is an object of the present invention to provide a method and apparatus whereby a joint line may be welded so that at the overlap region at the completion of the weld (known as the fade-out region) the beam penetration is gradually decreased. The joint line may be of circumferential or planetary form. A further object of the present invention is to allow the time share between welding and heat treating to be varied.

It is known to decrease the beam power in this region in a controlled fashion but the present invention proposes in its most general terms that the beam power in the fade-out region remain constant or be reduced to some predetermined proportion of the welding power.

According to a first aspect of the present invention there is provided a method of electron beam welding a workpiece, the method comprising making a weld by means of an electron beam, subsequently progressively reducing the power of the beam to the welded region and simultaneously transferring beam power to a raster pattern surrounding the welded region so as to reduce the weld penetration gradually and to cause a controlled cool-down rate of the weld near to the workpiece surface.

According to a second aspect of the present invention there is provided a method of controlling an electron beam welding apparatus, the apparatus including an electron beam welding deflection voltage supply, a voltage controlled oscillator, X and Y current amplifiers, a semi-conductor switch, and electron beam deflection coils, the method comprising the steps of producing a raster pattern to provide a required control of cooling rate over a predetermined area of a workpiece, producing a desired mark-to-space ratio of the oscillator and switching the semi-conductor switch so as to enable the current amplifiers to drive the deflection coils in a manner so as to control the fade-out slope rate of the welding region.

According to a third aspect of the present invention there is provided an electron beam welding apparatus provided with a quadrature oscillator and including a control system comprising a raster pattern generator for generating a raster pattern to cover a predetermined area of a workpiece to produce a required control of cooling rate, a voltage controlled oscillator, a ramp voltage control means to control the mark-to-space ratio of the voltage controlled oscillator, a semi-conductor switch capable of being switched by the voltage controlled oscillator, and X and Y current oscillators to drive the beam deflection coils of the electron beam welding apparatus and thereby control the electron beam deflection coils.

By way of explanation, the term "mark-to-space ratio" used in this specification means of ratio between "on" and "off" times in a square wave form.

The invention will now be described by way of example only with reference to the accompanying diagrammatic drawings in which, FIG. 1 is a schematic side view of an apparatus for electron beam welding an article and subsequently heat treating the resultant weld;

FIG. 2 is a block diagram of circuitry used in the apparatus of FIG. 1; and,

Figure 1:
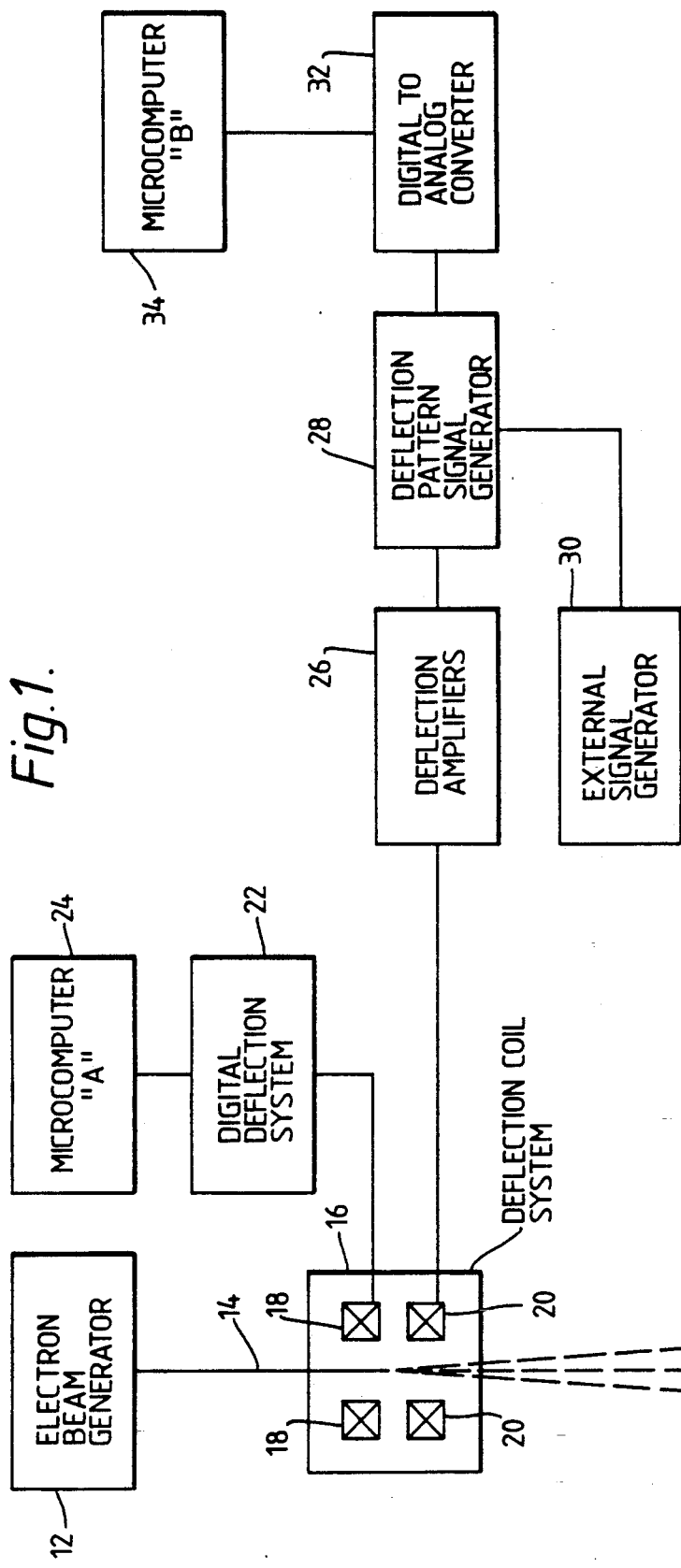

Referring to FIG. 1 there is shown a schematic layout of apparatus for electron beam welding an article or workpiece 10. There is provided a 6 kW, 150 kV electron beam generator 12 which generates a beam 14 of high energy electrons which pass through a deflection coil system 16, consisting of two paris of supplementary deflection coils 18, 20, to provide a raster pattern on the workpiece 10.

One pair of coils 18 is controlled by a digital programmable X,Y deflection pattern generator/amplifier 22 which in turn is controlled by a first microcomputer 24.

The second pair of coils 20 is controlled by a "time-share" deflection pattern signal generator system comprising a high current, high band width analog deflection amplifiers 26, an analog X,Y deflection pattern signal generator 28 which supplies a signal to the amplifiers 26, an external reference signal generator 30 which provides a reference signal to the pattern signal generator 28, and a digital to analog signal converter 32 which, in combination with a second microcomputer 34, controls "fade-out" of the raster pattern.

Referring to FIG. 2 there is shown further detail of the control system used in FIG. 1.

The control system operates by switching the two X,Y deflection pattern generators 22, 28 to the deflection coil system 16. Of these two X,Y deflection pattern generators, generator/amplifier 22 is a conventionally used quadrature oscillator which controls the beam deflection coils 18 in a known manner.

The other generator 28 is provided to produce a raster pattern to cover an area of workpiece weld so as to produce a required controlled cooling rate. The proportion of time operating with the first pattern generator 22 controlling the welding deflection coils 18 compared with the time spent operating with the second pattern generator 28, namely the raster pattern generator, is controlled by a ramp voltage generator 36. This latter generator 36 controls the fade-out slope rate by decreasing the mark-to-space ratio of a voltage controlled oscillator 38 which, in turn, switches a semi-conductor switch 40 the output of which is amplified by X and Y current amplifiers 42, 44 (part of the deflection amplifiers system 26) which supply outputs to drive the beam deflection coils 20 in the required manner.

The apparatus described above enables weld cool-down rate to be controlled in the fade-out region and, by extending the cool-down time of the weld, reduces the hardness of the surface of the workpiece, thereby resulting in improved material qualities. In addition, the apparatus can be used to heat treat the weld after an initial rapid quenching operation so that the material properties of the workpiece may be improved in the weld fusion zone.

In operation, the digital deflection system 22 was used to provide the normal welding oscillation of the electron beam, consisting of a 12 Hz ellipsoidal figure.

The heating of the material adjacent to the weld pool, in order to slow the cooling rate of the weld area, was accomplished by utilizing the beam "timeshare" deflection capability of the apparatus, as follows.

During normal welding, the beam spends 100% of the time in the weldpool. During the fade-out, the beam spends progressively more of the time in a raster pattern surrounding the weld area. This is provided by the second signal generator 28 which is controlled by microcomputer 34. Thus the fade-out slope profile can be of any form, although for simplicity a linear fade-out slope is convenient to use. As the electron beam current is reduced in the fade-down the power from the beam is transferred into the heating raster without melting the surface of the metal and is held for a period of time to effect the required condition. The total power of the in the weld region and the raster region is held constant.

Figure 3:
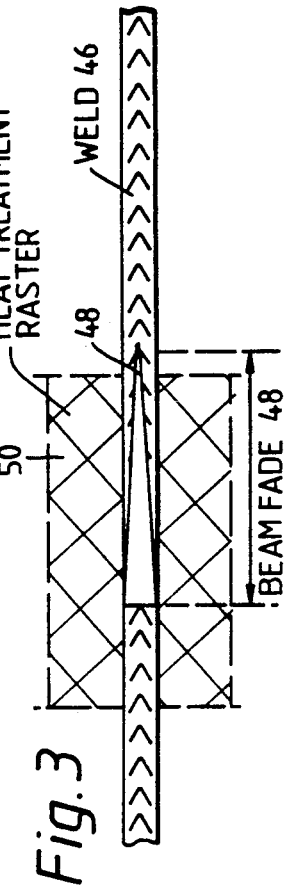
FIG. 3 is a plan view of a linear weld showing a heat treatment raster pattern applied to a weld by the apparatus of FIG. 1.

FIG. 3 shows a linear weld 46, indicated by the chevrons, an area of beam fade 48, indicated by the solid triangular portion overlying the weld, and the heat treatment raster 50, indicated by the rectangular hatched portion surrounding the weld area.

It can be seen that, in effect, the invention provides a means of superimposing upon a conventional electron beam weld deflection coil arrangement a system of deflection coil signals whereby the fade-out region of the weld may be controlled as required.

I claim:

1. A method of electron beam welding a workpiece comprising making a weld by means of an electron beam, subsequently progressively reducing the power of the beam to the welded region and simultaneously transferring beam power to a raster pattern surrounding the welded region so as to reduce the weld penetration gradually and to cause a controlled cool-down rate of the weld near to the workpiece surface.

2. A method of controlling an electron beam welding apparatus, the apparatus including an electron beam welding deflection voltage supply, a voltage controlled oscillator, X and Y current amplifiers, a semi-conductor switch, and electron beam deflection coils, the method comprising the steps of producing a raster pattern to provide a required control of cooling rate over a predetermined area of a workpiece, producing a desired mark-to-space ratio of the oscillator and switching the semi-conductor switch so as to enable the current amplifiers to drive the deflection coils in a manner so as to control the fade-out slope rate of the welding region.

3. An electron beam welding apparatus provided with a quadrature oscillator and including a control system comprising a raster pattern generator for generating a raster pattern to cover a predetermined area of a workpiece to produce a required control of cooling rate, a voltage controlled oscillator, a ramp voltage control means to control the mark-to-space ratio of the voltage controlled oscillator, a semi-conductor switch capable of being switched by the voltage controlled oscillator, and X and Y current oscillators to drive the beam deflection coils of the electron beam welding apparatus and thereby control the electron beam deflection coils.

* * * * *